Apr. 3, 1923.

H. NEGBAUR

OVENWARE AND HOLDER THEREFOR

Filed Nov. 25, 1921

1,450,330

INVENTOR
Harry Negbaur
BY John M Cole.
ATTORNEY

Patented Apr. 3, 1923.

1,450,330

UNITED STATES PATENT OFFICE.

HARRY NEGBAUR, OF NEW YORK, N. Y., ASSIGNOR TO E. & J. BASS, INCORPORATED, A CORPORATION OF NEW YORK.

OVENWARE AND HOLDER THEREFOR.

Application filed November 25, 1921. Serial No. 517,424.

*To all whom it may concern:*

Be it known that I, HARRY NEGBAUR, a citizen of the United States, residing at New York city, in the county and State of New York, have invented new and useful Improvements in Ovenware and Holders Therefor, of which the following is a specification.

This invention relates to improvements in oven baking ware made of glass of low expansion. Certain baking ware now in very common use is, as I understand, made of a boro-silicate glass such as that described in Sullivan and Taylor Patents Nos. 1,304,622 and 1,304,623 of May 27, 1919. All such ware, with which I am familiar, while most satisfactory as a baking dish, is not pleasing in appearance on account of a pale yellowish tinge in the glass. This marring of the beauty of these dishes is especially noticeable when they are used in silver or nickel frames. The yellowish tinge and silver do not harmonize.

An object of my invention is to improve these baking dishes without sacrificing any of their valuable properties by applying to them, preferably on the outer surface, a coloring material whereby the dish and holder may harmonize, the material to be such that it will permanently retain its color, will not wash off, or contaminate the food.

The accompanying drawings show the invention as applied to a pie plate, but it is to be understood that the invention may be applied to any sort of a glass baking dish such for example, as casseroles, roasters, ramekins, custard cups, etc.

These and many other dishes made from low expansion oven glass are available on the market.

In practicing my invention, I apply to the outer surface a composition containing a mineral pigment of desired coloring and a suitable vehicle. I have found that vitreous compositions containing suitable metallic oxides in borosilicate of lead as a vehicle and fluxing agent are suitable. This may be done with an air brush or by hand with an ordinary brush, or by dipping. The color may be uniform as to color and density all over the surface of the dish, or it may be varied in any desired way as to color and density to produce artistic designs. Among the colors which harmonize well with silver I may mention green, blue, pink and canary, the corresponding pigments being chrome green oxide, cobalt oxide, purple cassius and antimoniate of lead.

After the coloring material has been applied, the dishes are placed in a kiln, fired at a temperature of about 800 degrees Fahrenheit for about three hours, in order to drive off the organic vehicle and fix the metallic pigment in the glass. The pigment enters into the glass and gives it a permanent color, hiding the original yellow tinge. It also renders the dish somewhat translucent.

This finishes the process and the dish is then one which presents a most pleasing appearance, either when used alone or when used with a silver or nickel frame. Certain colors may be used to harmonize with copper frames.

Figure 1:
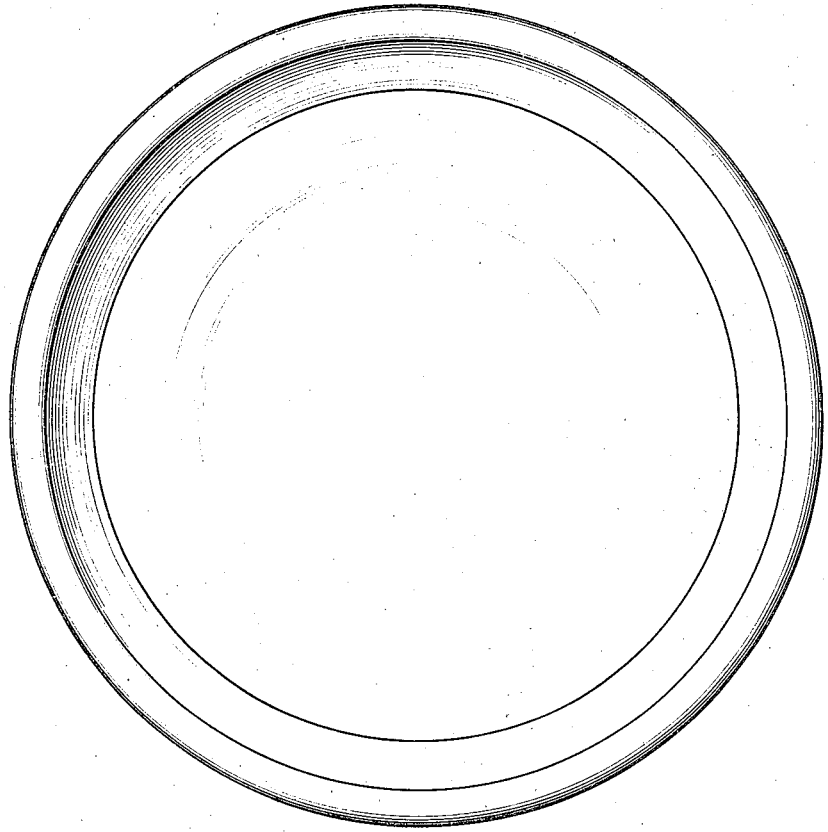
Fig. 1 shows a plan view of a pie plate.
Figure 2:
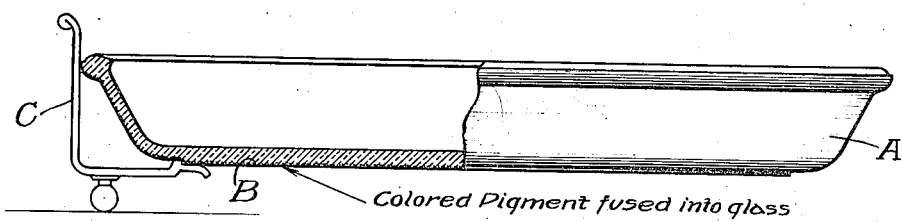
Fig. 2 shows an elevation partly in section, together with a frame for the dish.

In the latter figure the horizontal shading A and the stippling B indicate coloring material fused into the outer zone of the glass. A frame C is also provided. This frame may be of any suitable material preferably silver, but nickel or copper, tin or zinc may be used where desired.

I claim:

1. A transparent baking dish of pressed glass provided with mineral coloring material fused into the glass near one surface.

2. A baking vessel made of pressed glass of low expansion and provided with mineral coloring material fused into the glass near the outside surface.

3. A baking dish made of transparent boro-silicate glass having a yellowish tinge and provided with mineral coloring material fused into the glass near one surface, whereby the dish is rendered translucent and colored.

4. The combination with a metallic frame having a characteristic metallic color with a baking dish made of low expansion glass provided with a mineral pigment coloring material fused into the glass near one surface, the color of the pigment harmonizing with the color frame.

HARRY NEGBAUR.